May 29, 1956   G. R. MOHR   2,748,241
PLATE VOLTAGE AND GRID CURRENT CONTROL
Filed March 11, 1953   2 Sheets-Sheet 1
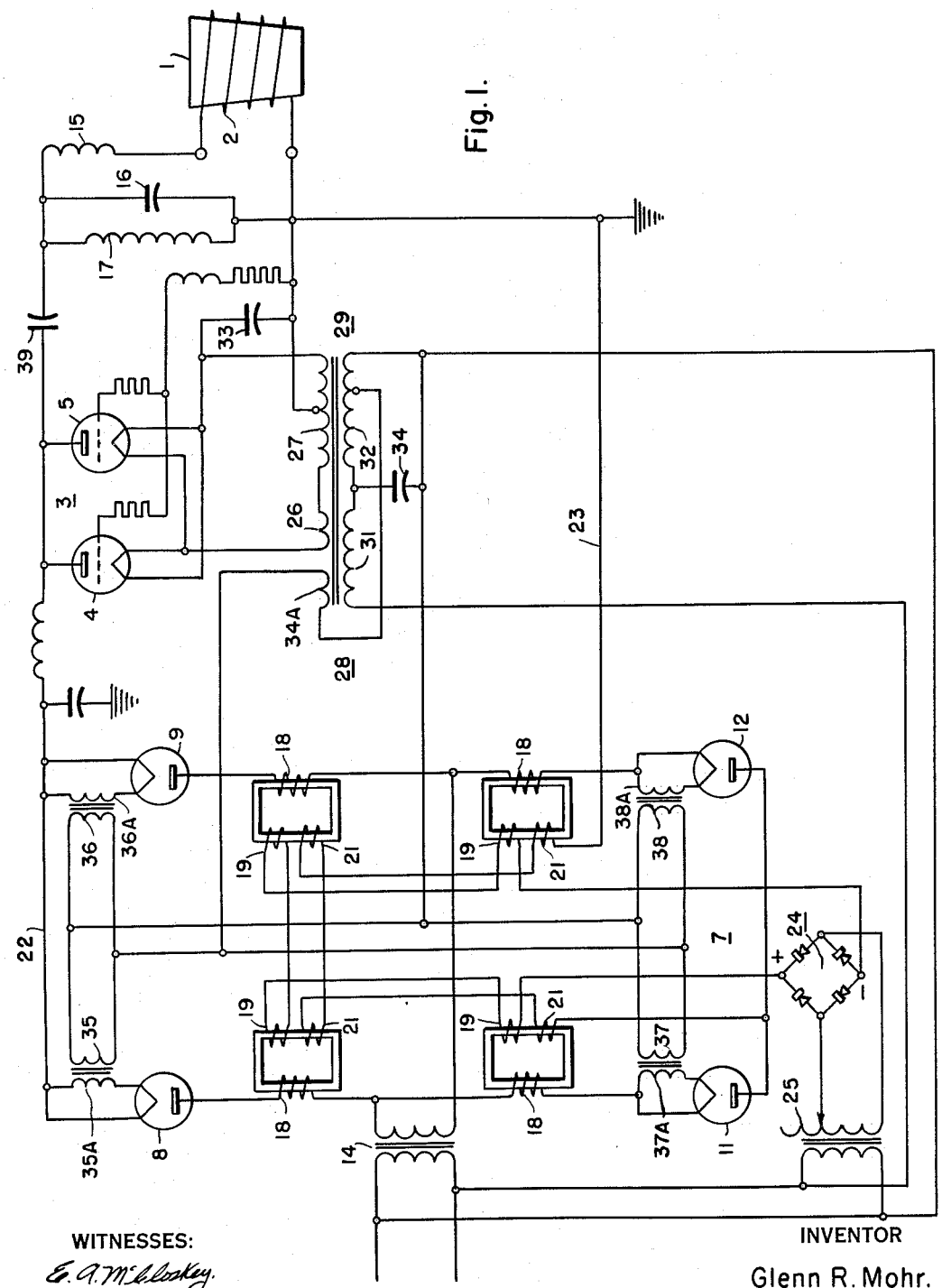
WITNESSES:
E. A. McCloskey.
R. M. Brodahl
INVENTOR
Glenn R. Mohr.
BY F. E. Browder
ATTORNEY

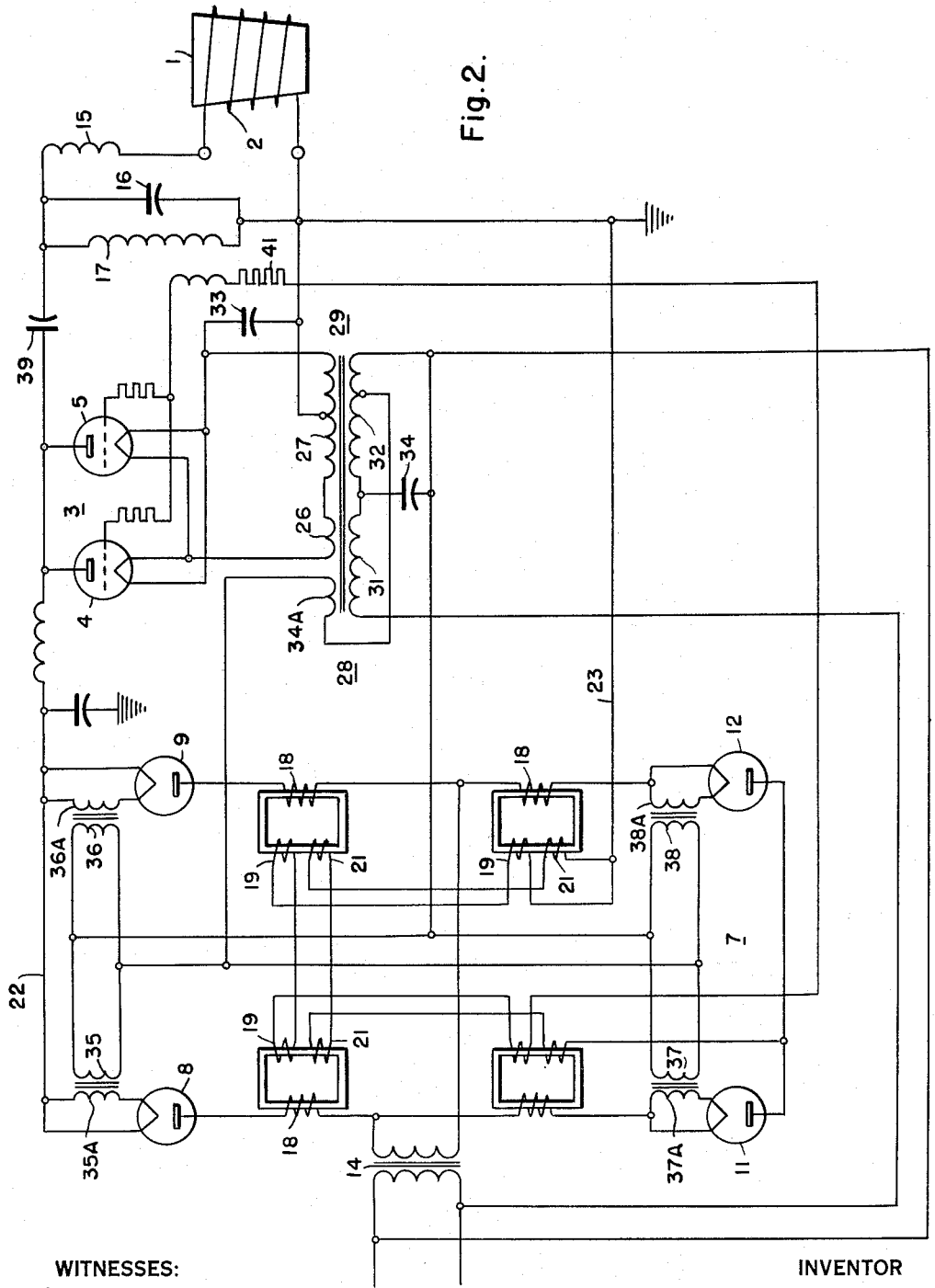

United States Patent Office 2,748,241
Patented May 29, 1956

2,748,241

PLATE VOLTAGE AND GRID CURRENT CONTROL

Glenn R. Mohr, Baltimore, Md., assignor to Westinghouse Electric Corporation, East Pittsburgh, Pa., a corporation of Pennsylvania Application March 11, 1953, Serial No. 341,808

6 Claims. (Cl. 219—10.77)

My invention relates to voltage regulating systems and in particular relates to systems employing saturable core reactors for regulating the output of direct current supply-sources.

In numerous instances in the electrical field it is desired to regulate a direct current supply, such as that furnished by a rectifier to the plate circuit of an oscillator supplying high frequency current to an induction or other heating load. In the prior art with which I am familiar such regulation is effected by inserting between the alternating voltage supply and the rectifier tubes a reactor having an iron core provided with a saturating winding supplied with direct current from a separate direct current source and varying the direct current to raise or lower the permeability of the core, thus adjusting the impedance drop which the reactor interposes between the alternating source and the input to the rectifiers.

In accordance with my present invention I cause automatic regulation of the rectifier output by adding to the saturable reactor a control winding which is traversed by a current proportional to the plate current of the oscillator supplying the heating load. Thus if there is a drop in the plate current of the oscillator the strength of the current through the direct-current saturating winding of the reactor decreases and this is arranged so as to decrease the reactance between the alternating supply and the rectifier input, thereby raising the rectifier output voltage and tending to neutralize the drop in the oscillator plate current. The opposite reaction follows a rise in plate current of the oscillator.

One important instance of sudden drop of oscillator plate current as load temperature rises is met with in heating of iron or steel materials by induction heating. In such cases the load itself forms a large part of the magnetic circuit linking the oscillator output, and its permeability is high as long as the load temperature remains below a certain critical value, known as the Curie point. Above that temperature the permeability of iron falls abruptly to unity, and its coupling to the heating transformer primary winding falls. The resulting decrease in oscillator plate current is, in my arrangement, caused to decrease the reactance of the saturable reactor allowing the oscillator plate current and voltage to increase and cause the heating effect in the iron to approach its old value.

One object of my invention is accordingly to provide a novel and improved regulator for direct current voltage sources.

Another object is to provide a new and improved regulator system for oscillation generators supplied with plate current through rectifiers from alternating current supplies.

Another object is to provide a regulator for automatically controlling the output voltage of high frequency electric heaters energized from oscillators having saturable reactor type regulators in their plate current supplies.

Still another object is to provide a voltage regulator of the saturable reactor type for oscillators in which the saturation is automatically regulated in accordance with the plate and grid currents of the oscillator.

Other objects of my invention will become apparent upon reading the following description taken in connection with the drawings, in which:

Fig. 1 is a schematic diagram of a high frequency heating system having a regulator embodying the principles of my invention; and Fig. 2 is a similar diagram of a high frequency heating system in which is incorporated a modified form of the regulator of my invention.

Referring in detail to Fig. 1 a heating member or load 1, which may for instance be a crucible containing a charge of steel surrounded by an inductor 2, is supplied with high frequency current from an oscillator 3 which may comprise a pair of parallel-connected triodes 4, 5 supplied with direct current from a rectifier 7. The latter comprises diodes 8, 9, 11, 12 each fed through a saturable reactor from any suitable alternating current source including a transformer 14. The inductor 2 is connected through a regulating inductor 15 to form a tank circuit of conventional type comprising a capacitor 16 furnishing grid excitation to oscillator 3 through the agency of an inductor 17.

Each saturable reactor comprises a load winding 18 on a magnetic core non-inductively connected in ways well-known in the art relative to two core-saturating windings 19 and 21 which act to control the magnetic saturation and permeability of the iron core when supplied with direct current. The load-windings 18 connect diodes 8 and 11 to one side of the alternating supply 14 with opposite polarities, and the other pair of windings 18 connect diodes 9 and 12 to the other side of alternating supply 14 similarly. Joining the cathodes of diodes 8 and 9 to one side 22 of a direct current output line and the anodes of diodes 11 and 12 together will be seen to produce a well-known "Bridge" rectifier connection. The line 22 is connected to the plates of the oscillator tubes 4, 5, while the common anodes of diodes 11, 12 are connected to the grounded line 23 through saturating windings 21 of the saturable core reactors. The saturating windings 19 of the saturable core reactors are serially connected across the direct current output of an auxiliary rectifier 24 whose input terminals are connected to the variable-tap secondary winding of a transformer 25 having its primary connected across the alternating supply 14. Adjusting the tap on transformer 25 varies the current through saturating windings 19 and so adjusts the permeability and reactance of the saturable reactors as will be pointed out below.

Heating current for the cathodes of the oscillators 4 and 5 is supplied through two serially connected secondary windings 26, 27 of two transformers 28, 29 whose primary windings 31, 32 are connected in series across the alternating source 14. Between one terminal and an intermediate point on secondary winding 27 is connected a capacitor 33 and the intermediate point is connected to ground wire 23. The primary winding 32 is shunted with a capacitor 34 and an intermediate tap on said primary is connected through a secondary winding 34A on transformer 28 to one side of four primary windings 35, 36, 37, 38 which have secondary windings 35A, 36A, 37A, 38A supplying heating current to the cathodes of diodes 8, 9, 11 and 12.

One side of tank circuit 15, 16 is connected to ground-line 23 and the other side is connected through blocking capacitor 39 to the anodes of oscillator tubes 4 and 5.

A moment's consideration will show that the direct current component of the plate-to-cathode current in oscillator tubes 4, 5 can find its way to the negative terminal of the rectifier bridge (i. e. to the common anodes of diodes 11, 12) only by way of the tap on secondary winding 27, ground-line 23, and saturating windings 21 on the saturable core reactors feeding the rectifiers 8, 9, 11, 12. Any change in the magnitude of the plate current of the oscillators 4, 5 will thus change the permeability and voltage drop through the saturable reactor which is in series between the alternating supply 14 and the rectifier 7, thereby altering the direct current voltage impressed on the oscillators 4, 5; and this change may be made to neutralize tendencies of the power input to the heater member 1 to change when its magnetic or other properties change. Typical examples where this neutralization occurs will now be described.

For example, suppose the material in heating member or furnace 1 is iron. Starting to heat from room temperature its magnetic permeability is large at the outset and the winding 2 has a large reactance which may be resonated with the remainder of tank circuit 15, 16. This condition continues as long as the iron in heater 1 remains below the Curie temperature. During this initial phase of the heating the rectifier 24 is so connected that current through saturating winding 19 is of opposite magnetic effect from that of the plate current from oscillator 4, 5 flowing in winding 21. The magnitude of the current in winding 19 can, of course, be adjusted as desired by moving the tap on transformer 25. It is adjusted to partly, but only partly, neutralize the magnetic effect on current in winding 21, so that the saturable reactor has a substantial voltage drop.

When the heated load reaches the Curie temperature the permeability of the heated iron drops abruptly to unity, and the plate current of oscillator tubes 4, 5 starts to decrease. The degree to which this current in winding 21 neutralizes the saturating effect of current from rectifier 24 flowing in winding 19 also decreases and the permeability and voltage drop through the saturable reactor are reduced. This reduction of the series reactance permits the rectifier output voltage and current to rise again toward the values they had before the Curie temperature was reached. If, instead of connecting the plate current of oscillators 4, 5 to saturating winding 21 directly, it is arranged to vary the grid voltage of an amplifier supplying these windings, the restoration of the heating power to its pre-Curie value can be made complete.

When, instead of heating iron over a temperature range which includes the Curie point, it is desired to maintain a constant voltage and constant temperature for a heated member or load 1, the plate current is set at the value which heats the load to the desired temperature and the adjustable transformer 25 is then set to decrease the reactor core saturation to a point where the alternating voltage drop in the reactor just exceeds the line voltage drop, the magnetizing effects of windings 19 and 21 being opposed but the effect of winding 19 predominating. A drop in line voltage would decrease the oscillator tube plate current, lessening its ability to oppose saturating winding 19 and so causing a decrease in the reactance of the saturable reactor. As a result the decrease in rectifier voltage is counteracted and the plate current tends to be restored to its old value. In short, the reactor tends toward maintaining the rectifier output voltage constant when the supply line voltage varies.

Fig. 2 shows a modified form of saturable reactor in which the rectifier 24 and adjustable transformer 25 of Fig. 1 are replaced as a source of auxiliary saturating current by the grid circuit of the oscillator tubes 4, 5. This grid current in conventional oscillators may rise at times by as much as 200 percent when load is removed from an inductively coupled oscillator. By causing this increase of grid current to decrease reactor saturation the oscillator plate voltage is lowered with a concomitant lowering of the grid voltage toward its previous value.

Thus in Fig. 2 the elements are the same as those to which the same reference numerals are applied in Fig. 1 except that rectifier 24 and its supply transformer 25 are omitted, and current for winding 19 comes from the grids of oscillators 4, 5 through a resistor 41. The oscillator grid current in winding 19 bucks the effect of the oscillator plate current but is able to overcome its magnetic effect only partly, so that at full load the plate current saturates the reactor core and its reactance is at a minimum. Decrease of load current decreases saturation and increases the reactance but the grid current increases and this decreases saturation still further. The result is that saturation decreases and reactance increases very abruptly.

While I have described my invention in a preferred practical application, it is obvious that its teachings are subject to more general application that the equipment is subject to wide modifications which still embody the principles and teachings disclosed herein.

I claim as my invention:

1. In electrical apparatus operable with a source of alternating current, the combination of a rectifier, an oscillator connected to said rectifier, and a reactor including a magnetic core and at least first, second and third windings on said core, a source of direct current, said first winding being adapted for connection between said source of alternating current and said rectifier such that said first winding is energized by current flow to said rectifier, said second winding being connected to said source of direct current, and said third winding being connected to said oscillator such that the third winding is energized by current flow through said oscillator.

2. In combination with a rectifier comprising a unilateral conductor, reactor means traversed by current flow to said rectifier and having a magnetic core, said reactor means having a first winding connected to said unilateral conductor, a second winding and a third winding for magnetically saturating said core, an oscillator comprising principal electrodes and a control electrode, means for connecting said second winding to carry direct current passing from said rectifier to said oscillator, and means to connect said third winding to carry the current of said control electrode.

3. In combination with a polyphase rectifier having a diode in each phase, reactor means connected in each phase of said rectifier, said reactor means comprsing a magnetic core having a first winding connection to said rectifier, a second winding and a third winding for magnetically saturating said core, an oscillator energized by said rectifier with direct current from said rectifier to said oscillator flowing through said second winding, and an auxiliary source of direct current in series with said third winding.

4. In combination with a polyphase rectifier having a diode in each phase, a reactor traversed by current flow of each said phase, said reactor comprising a magnetic core having a first winding connected to said rectifier, a second winding and a third winding for magnetically saturating said core, an oscillator energized by said rectifier and provided with a control electrode and main electrodes, direct current from said rectifier to said oscillator flowing through said second winding, and said third winding connected in series with said control electrode.

5. In combination with a rectifier comprising a unilateral electrical conductor, reactor means traversed by current flow through said rectifier, said reactor means having a magnetic core and a first winding traversed by current to said rectifier, a second and a third winding on said reactor arranged to saturate said core, an oscillator comprising an anode, a cathode and a grid, said anode and cathode being supplied with direct current from said rectifier through said second winding, and said third winding being connected in series relation with said grid.

6. In combination with a rectifier comprising a unilateral electrical conductor, reactor means traversed by current flow through said rectifier, said reactor means having a magnetic core and a first winding traversed by current to said rectifier, a second and a third winding on said reactor arranged to saturate said core, an oscillator comprising an anode, a cathode and a grid, said anode and cathode being supplied with direct current from said rectifier through said second winding, and said third winding being connected in series relation with said grid, and a heating load supplied with power by said oscillator.

References Cited in the file of this patent

UNITED STATES PATENTS

| | | |
|---|---|---|
| 2,511,219 | Pogorzelski | June 13, 1950 |
| 2,521,880 | Storm | Sept. 12, 1950 |
| 2,690,536 | Adams | Sept. 28, 1954 |

FOREIGN PATENTS

| | | |
|---|---|---|
| 439,166 | Great Britain | Dec. 2, 1935 |
| 588,714 | Great Britain | June 2, 1947 |